US008173726B2

(12) United States Patent
Heuts et al.

(10) Patent No.: US 8,173,726 B2
(45) Date of Patent: May 8, 2012

(54) POLYMERIZATION OF A REACTIVE DILUENT IN THE PRESENCE OF AN EPOXY-AMINE MATERIAL, AND COATING COMPOSITIONS PREPARED THEREBY

(75) Inventors: Martin Peter Joseph Heuts, Andover, MN (US); Lonnie Jones, Minneapolis, MN (US)

(73) Assignee: Valspar Sourcing, Inc., Minneapolis, MN (US)

( * ) Notice: Subject to any disclaimer, the term of this patent is extended or adjusted under 35 U.S.C. 154(b) by 0 days.

(21) Appl. No.: 12/899,806

(22) Filed: Oct. 7, 2010

(65) Prior Publication Data

US 2011/0020557 A1   Jan. 27, 2011

Related U.S. Application Data

(60) Division of application No. 12/489,305, filed on Jun. 22, 2009, now abandoned, which is a continuation of application No. 10/507,168, filed as application No. PCT/US03/06969 on Mar. 7, 2003, now abandoned.

(60) Provisional application No. 60/362,608, filed on Mar. 8, 2002.

(51) Int. Cl.
  *C08L 63/00* (2006.01)
  *C08L 33/10* (2006.01)
(52) U.S. Cl. ........ 523/414; 525/113; 525/529; 525/530; 525/531; 525/533
(58) Field of Classification Search ................ None
  See application file for complete search history.

(56) References Cited

U.S. PATENT DOCUMENTS

| | | | |
|---|---|---|---|
| 4,085,161 A | 4/1978 | Sekmakas et al. | |
| 4,446,258 A | 5/1984 | Chu et al. | |
| 4,468,307 A | 8/1984 | Wismer et al. | |
| 4,476,262 A | 10/1984 | Chu et al. | |
| 4,605,690 A | 8/1986 | Debroy et al. | |
| 4,608,314 A | 8/1986 | Turpin et al. | |
| 4,639,299 A | 1/1987 | Turpin et al. | |
| 4,742,097 A | 5/1988 | Turpin et al. | |
| 4,981,887 A | 1/1991 | Ruhoff et al. | |
| 5,082,922 A | 1/1992 | Brandenburger et al. | |
| 5,252,637 A | 10/1993 | Craun et al. | |
| 5,264,469 A | 11/1993 | Mysliwczyk et al. | |
| 5,296,525 A | 3/1994 | Spencer | |
| 5,324,404 A * | 6/1994 | Ott et al. ................ | 204/501 |
| 5,567,781 A | 10/1996 | Martino et al. | |
| 5,635,049 A | 6/1997 | Mysliwczyk et al. | |
| 5,686,511 A | 11/1997 | Bobo | |
| 5,840,384 A | 11/1998 | Noda et al. | |
| 5,908,902 A | 6/1999 | Pfeil et al. | |
| 5,922,817 A | 7/1999 | Pedersen et al. | |
| 5,925,694 A | 7/1999 | Stengel-Rutkowski et al. | |
| 5,932,636 A | 8/1999 | Neumann et al. | |
| 5,972,432 A | 10/1999 | Chutko et al. | |
| 5,976,700 A | 11/1999 | Chutko et al. | |
| 6,087,417 A | 7/2000 | Stevenson et al. | |
| 6,201,043 B1 | 3/2001 | Bremser et al. | |
| 6,235,102 B1 | 5/2001 | Parekh et al. | |
| 6,270,855 B1 | 8/2001 | Jung et al. | |
| 6,300,428 B1 | 10/2001 | Stevenson et al. | |
| 6,306,934 B1 | 10/2001 | Bode et al. | |
| 7,037,584 B2 | 5/2006 | Wind et al. | |
| 7,682,699 B2 | 3/2010 | Wind et al. | |
| 2005/0209371 A1 | 9/2005 | Heuts et al. | |
| 2009/0258150 A1 | 10/2009 | Heuts et al. | |

FOREIGN PATENT DOCUMENTS

| | | |
|---|---|---|
| EP | 0 116 225 A1 | 8/1984 |
| EP | 0 399 350 A2 | 11/1990 |
| JP | 3062819 A | 3/1991 |
| WO | WO 00/47642 A1 | 8/2000 |
| WO | WO 03/076530 A2 | 9/2003 |
| WO | WO 03076536 A1 * | 9/2003 |

OTHER PUBLICATIONS

American Society of Testing Materials, "ASTM Designation: D 2369-86, Standard Test Method for Volatile Content of Coatings," *Annual Book of ASTM Standards*, 1987;06.01:415-417, Publication page, and Title page.

American Society of Testing Materials, "ASTM Designation: D 3359-02, Standard Test Method for Measuring Adhesion by Tape Test," *Annual Book of ASTM Standards*, 2004;06.01:397-403, Publication page, and Title page.

McCutcheon's, vol. 1: Emulsifers & Detergents, North American Edition (2001). Title Page, Copyright and Table of Contents Page.

* cited by examiner

*Primary Examiner* — Michael J Feely
(74) *Attorney, Agent, or Firm* — Valspar Sourcing, Inc.

(57) ABSTRACT

A process including the polymerization of a reactive diluent, which is present in an aqueous dispersion that further includes an epoxy-amine material, is disclosed. The resulting composition is useful as a coating composition.

4 Claims, No Drawings

POLYMERIZATION OF A REACTIVE DILUENT IN THE PRESENCE OF AN EPOXY-AMINE MATERIAL, AND COATING COMPOSITIONS PREPARED THEREBY

This application is a divisional of Ser. No. 12/489,305, filed Jun. 22, 2009 (now abandoned), which is a continuation of Ser. No. 10/507,168, filed May 5, 2005 (now abandoned), which is a 371 U.S. National Stage application of International Application No PCT/US03/06969 having an International Filing Date of Mar. 7, 2003, which claims the benefit of U.S. Provisional Application No. 60/362,608, filed Mar. 8, 2002, all of which are incorporated herein by reference in their entireties.

BACKGROUND

Various coating compositions, methods for coating substrates with such compositions, and methods of curing the coated substrates are well known in the art. A coating composition is sometimes applied as a film, which may include a carrier (e.g., water and/or organic solvent). The coating may be applied on a substrate by a process such as lamination, solution or dispersion coating, powder coating, electrocoating, spray coaling, roll coating, or reverse roll coaling. Coating compositions can also be applied as a film by extrusion in melt form through an extrusion coating die onto a substrate. Once coated on the substrate, the composition is preferably cured (and dried if the composition includes a carrier) without defects within a few seconds, as modem high speed coating lines heat the coated substrates rapidly to temperatures of up to 490° F. (254° C.). Using such techniques, many different types of substrates have been coated including, for example, wood, plastics, and metal in the form of sheets, ships, or coils. Metal-coated substrates are especially useful in the packaging, processing, and holding of foods and beverages.

It is desirable to avoid the use of excess organic solvent in a coating method so that the environmental hazards of allowing organic solvent to evaporate into the atmosphere are minimized. However, a relatively large quantity of organic solvent is typically required in order to process the coating composition and provide a coalesced film after drying.

Epoxy resins are particularly desirable for use in protective surface coating compositions, e.g., as a vehicle or polymeric binder for optional pigments, fillers, and other additives. The epoxy resins advantageously provide properties such as toughness, flexibility, adhesion, and chemical resistance.

A number of attempts have been made in the prior art to prepare aqueous, solvent based, or solvent free coating compositions suitable for use in a process for forming cured coated substrates. For example, container coating technology has utilized an epoxy resin that has been grafted with acrylic monomers, styrene, and methacrylic acid. This grafted epoxy resin is prepared in solvent, usually butyl cellosolve and/or n-butanol, to maintain low processing viscosities, and then reduced with water by a direct or inverse let down procedure. Although the cured film properties are highly desirable, such coatings suffer from the fact that sizeable amounts of solvents are required to obtain good performance. High molecular weight epoxy resins typically require 25% to 50% solvent (based on total solids plus organic solvent) before the composition is reduced with amine and water.

Another problem that commonly arises during attempted preparation of a water based coating composition is the formation of an extremely high molecular weight product that cannot be dissolved or dispersed in water. There is a continuing need for aqueous coating compositions that can be applied to a substrate to provide excellent coating characteristics.

SUMMARY

In one aspect, the present invention provides a method of preparing a coating composition, and coating compositions prepared thereby. The method includes the steps of making an aqueous dispersion of a composition including an advanced molecular weight epoxy-amine material and a reactive diluent, and polymerizing the reactive diluent to provide the coating composition. Preferably, the method further includes the step of combining an amine and an epoxy material in the presence of a reactive diluent to provide the composition including an advanced molecular weight epoxy-amine material and a reactive diluent. Preferably, the step of making the aqueous dispersion includes combining the composition with an acid. Preferably, the coating composition has a volatile organic compound content of at most 0.2 kilograms per liter of solids.

In another aspect, the present invention provides a method of coating an article. The method includes the steps of applying the above-described coating composition to an article and hardening the coating composition to provide a coated article. Preferably, the method includes the step of heating the coated article to provide a crosslinked coating.

DEFINITIONS

The terms related to coating compositions and methods for coating substrates are used in accordance with the understanding of one skilled in the art, unless otherwise noted. For example, the terms "coating solids" and "coating solids component" refer to the sum of the mass of components used in the composition (e.g., epoxy-amine material, reactive diluent, epoxy material, and any other reactive curing agents, reactive diluent components, or initiators that are employed), exclusive of water or organic solvent. As used herein, "solvent" refers to a volatile liquid component of the composition that does not react during the curing or baking steps. Most of the solvent is generally volatilized during a baking step and does not become incorporated into the cured coating. The organic solvent is typically made up of saturated organic compound(s) having a molecular weight of less than 300 Daltons.

As used herein, "advanced molecular weight epoxy-amine material" refers to the reaction product of an epoxy material (e.g., an epoxy resin) with an amine to provide an epoxy-amine material having increased (i.e., advanced) molecular weight compared to the starting epoxy material. Preferably the epoxy-amine material has residnal epoxy functionality.

"Polymerization" or "polymerizable" denotes the curing or cross-linking of the coating composition after a coated substrate is exposed to radiation (e.g., ultra-violet or electron beam), heat, or other means of initiating polymerization. "Thermosettable" or "thermoset" refers to a composition that is transformed into a gel structure by application of radiation and/or heat. A gel structure is one that is largely insoluble in any solvent.

As used herein, "volatile organic compound" ("VOC") refers to any compound of carbon, excluding carbon monoxide, carbon dioxide, carbonic acid, metallic carbides or carbonates, and ammonium carbonate, which participates in atmospheric photochemical reactions. Typically, volatile organic compounds have a vapor pressure equal to or greater than 0.1 mm Hg. As used herein, "volatile organic compound content" ("VOC content") means the weight of VOC per volume of the coating solids, and is reported, for example, as kilograms (kg) of VOC per liter.

DETAILED DESCRIPTION OF PREFERRED EMBODIMENTS

The present invention provides a method of preparing an advanced molecular weight epoxy-amine material in the presence of a reactive diluent. The advanced molecular weight epoxy-amine material is preferably prepared by combining an amine with an epoxy material in the presence of a reactive diluent. The composition, which includes the advanced molecular weight epoxy-amine material and the reactive diluent, is useful for making a coating composition by making an aqueous dispersion of the composition, followed by polymerizing the reactive diluent.

Epoxy Materials

Epoxy materials including, for example, epoxy resins or compounds, are materials containing epoxy groups. Epoxy materials used in the present invention may be prepared by a variety of processes including, for example, the condensation of a dihydroky compound with epichlorohydrin. Dihydroxy compounds useful for preparing the epoxy materials include, for example, diphenols and dihydric alcohols. Preferred epoxy materials include, for example, materials derived from the condensation of Bisphenol A and/or Bisphenol F with epichlorohydrin.

Epoxy materials suitable for use in the present invention may be prepared according to known methods including those described in U.S. Pat. Nos. 4,446,258 (Chu et al.) and 4,476,262 (Chu et al.). Typically, epoxy materials are prepared by reacting one equivalent of Bisphenol A or Bisphenol F with the desired number of equivalents of epichlorohydrin to produce a material with residual epoxy functionality (e.g., an epoxy resin). Suitable epoxy materials include, for example, those available under the trade designations EPON 828, EPON 1001, EPON 1004F, EPON 1007, EPON 1009 from Resolution Performance Products (Houston, Tex.). Commercially available epoxy materials may contain a mixture including, for example, diepoxides, monoepoxides, and aromatic polyethers that are free of epoxy groups. Preferred epoxy materials have an epoxy equivalent weight (EEW) of at most 2000. Preferably, the epoxy material is capable of being dissolved in a reactive diluent.

Preferred epoxy materials include glycidyl end-capped poly(Bisphenol A-co-epichlorohydrin), glycidyl end-capped poly(Bisphenol E-co-epichlorohydrin), glycidyl end-capped poly(Bisphenol F-co-epichlorohydrin)-co-(Bisphenol A-co-epichlorohydrin), poly(atkylene glycol) diglycidyl ether, poly(tetrahydrofuran) diglycidyl ether, and combinations thereof. Preferably, the poly(alkylene glycol) diglycidyl ether is poly(ethylene glycol) diglycidyl ether or poly(propylene glycol) diglycidyl ether. Particularly preferred epoxy materials include, for example, those available under the trade designation EPON 1004F from Resolution Performance Products (Houston, Tex.)

Amines

Amines useful for reacting with epoxy materials to form advanced molecular weight epoxy-amine materials include materials having primary, secondary, and/or tertiary amine-functionality. Useful amines include monoamines, diamines, and polyamines. Examples of useful amines include those listed in U.S. Pat. No. 4,468,307 (Wismer et al.) Preferably, the amine has an amine equivalent weight of 22 to 300.

Preferred amines include monoamines (e.g., hydroxy-functional amines). Polyamines including, for example, ethylene diamine, diethylene triamine, triethylene tetraamine, N-(2-aminoethyl)ethanolamine, piperizine, and combinations thereof, may also be useful. However, when polyamines are used, preferably they are not used in large amounts because of their tendency to cause gelation of reaction mixtures.

Preferred amines include secondary and tertiary amines. Primary amines may also be useful, however they may have a tendency to cause gelation of reaction mixtures, since one equivalent of primary amine is capable of reacting with more than one equivalent of epoxy-functionality. When using polyamines and/or primary amines, special precautions may be taken to avoid gelation. For example, excess amine can be used and the excess can be vacuum stripped at the completion of the reaction. Also, the epoxy material may be added to the amine to ensure that excess amine is present.

Useful hydroxy-functional amines include, for example, alkanolamines, dialkanolamines, trialkanolamines, alkylalkanolamines, arylalkanolamines, arylalkylalkanolamines, and combinations thereof, in which the alkanol, alkyl, and/or aryl chains preferably contain 2 to 18 carbon atoms. Preferred hydroxy-functional amines include, for example, ethanolamine, N-methylethanolamine, diethanolamine, N-phenylethanolamine, N,N-dimethylethanolamine, N-methyldiethanolamine, triethanolamine, and combinations thereof.

Non hydroxy-functional amines (e.g., monoalkyl amines, dialkyl amines, trialkyl amities, mixed alkyl-aryl amines, and substituted amines in which the substituents are other than hydroxy) may also be useful. If substituted amines are used, preferably the substituents do not detrimentally affect the reaction of the amine with the epoxy material. Preferred non hydroxy-functional amines include, for example, ethylamine, propylamine, methylethylamine, diethylamine, N,N-dimethylcyclohexylarnine, triethylamine, N-benzyldimethylamine, dimethylcocoamine, dimethyltallowamine, and combinations thereof.

Other amines including, for example, hydrazine and propylene imine, may also be useful. Ammonia may also be useful, and for the purposes of this application is considered to be an amine. Combinations of the various amines described above can also be used.

Reactive Diluents

Reactive diluents are used in conjunction with the epoxy materials to prepare the advanced molecular weight epoxy-amine materials and, ultimately, the coating compositions. As used herein, "reactive diluent" refers to monomers and/or oligomers that are substantially non-reactive with the epoxy material and/or amine under the conditions used to prepare the epoxy-amine material. Reactive diluents useful in the present invention are preferably capable of undergoing a reaction to form a polymer and/or an interpenetrating network. Reactive diluents useful in the present invention include, for example, monomers and/or oligomers that are capable of undergoing free radical reactions. Preferably, the reactive diluent has a molecular weight of 100 Daltons to 350 Daltons.

Useful reactive diluents include monofunctional and multifunctional reactive diluents. Preferred reactive diluents include vinyl compounds, methacrylate compounds, and combinations thereof.

When the reactive diluent is a vinyl compound, the vinyl compound is preferably a vinyl aromatic compound. Useful vinyl aromatic compounds include, for example, styrene, substituted styrenes, and combinations thereof.

The reactive diluent may also be a methacrylate compound. Preferred methacrylate compounds include, for example, butylmethacrylate, methyl methacrylate, ethyl methacrylate, isobutyl methacrylate, 2-hydroxyethyl methacrylate, isobornyl methacrylate, poly(ethylene glycol) methacrylate, poly(propylene glycol) methacrylate, and combinations thereof.

Preferably, the reactive diluent functions as a solvent to dissolve, disperse, or otherwise lower the viscosity of the materials used in the preparation of the epoxy-amine material. Although the use of a reactive diluent preferably reduces or eliminates the need to use substantial amounts of a solvent, solvents may nonetheless be added as desired.

Additional reactive diluents may also be used in combination with the reactive diluents described above. The additional reactive diluents may be introduced anytime before polymerizing the reactive diluents. Preferably, they are introduced after making the aqueous dispersion.

Additional reactive diluents may be monofunctional or multifunctional reactive diluents. Useful additional reactive diluents, in addition to the reactive diluents described above, include, for example, acrylate compounds. Useful acrylate compounds include, for example, butyl acrylate, ethyl acrylate, 2-ethylhexyl acrylate, isobutyl acrylate, tert-butyl acrylate, 2-hydroxyethyl acrylate, poly(ethylene glycol) acrylate, isobornyl acrylate, glycidyl acrylate, gylcidyl methacrylate, acrylic acid, and combinations thereof.

Advanced Molecular Weight Epoxy-Amine Material

Advanced molecular weight epoxy-amine materials may be prepared by combining an amine with an epoxy material in the presence of a reactive diluent. Preferably, at least 0.1 equivalent of amine, more preferably at least 0.2 equivalent of amine, and most preferably at least 0.3 equivalent of amine is combined with each equivalent of epoxy material. Preferably, at most 1.05 equivalents of amine, more preferably at most 1 equivalent of amine, and most preferably at most 0.95 equivalent of amine is combined with each equivalent of epoxy material.

Preferably, at least 7.5% by weight, more preferably at least 15% by weight, and most preferably at least 20% by weight reactive diluent is used based on the total combined weight of epoxy material, amine, and reactive diluent. Preferably, at most 80% by weight, more preferably at most 50% by weight, and most preferably at most 30% by weight reactive diluent is used based on the total combined weight of epoxy material, amine, and reactive diluent.

An example of a convenient procedure for preparing advanced molecular weight epoxy-amine material is to first dissolve the epoxy material in the reactive diluents. Preferably, the epoxy material dissolves at a temperature of at most 130° C., more preferably at most 120° C., and most preferably at most 110° C. The materials may be agitated as desired to assist in the dissolution.

When using some reactive diluents, it may be desirable to prevent the reactive diluent from polymerizing at the dissolution temperatures. Convenient methods of preventing the polymerization include, for example, maintaining an oxygenated condition and/or adding antioxidants and/or inhibitors. Preferred inhibitors include, for example, 2,6-di-tert-butyl-4-methylphenol. When antioxidants and/or inhibitors are used, they are preferably used in at least 0.01% by weight based on based on the total combined weight of epoxy material, amine, and reactive diluent. When antioxidants and/or inhibitors are used, they are preferably used in at most 0.5% by weight based on based on the total combined weight of epoxy material, amine, and reactive diluent.

After the epoxy material has been dissolved in the reactive diluent, the temperature of the mixture may be adjusted (e.g., cooled) to the desired temperature for addition of the amine. After the addition of the amine, the temperature of the mixture may be adjusted as desired to allow the reaction to take place. Preferably, the reaction temperature is at most 130° C., more preferably at most 120° C., and most preferably at most 110° C.

When the amount of amine used is low (e.g., the ratio of equivalents of amine to equivalents of epoxy material is less than 1), advanced molecular weight epoxy-amine material having residual epoxy functionality may be prepared. The residual epoxy functionality may hydrolyze during the preparation of the aqueous dispersion to provide hydroxy functionality, which can be used, for example, to react with suitable crosslinkers.

Alternatively, advanced molecular weight epoxy-amine materials having residnal epoxy functionality may be reacted with active hydrogen compounds (e.g., as described below) to further advance the molecular weight of the epoxy-amine material. The reaction of an active hydrogen compound with an advanced molecular weight epoxy-amine materials having residnal epoxy functionality may be carried out before making the aqueous dispersion, after making the aqueous dispersion, or after polymerizing the reactive diluent as desired.

Preferably, at most 1.05 equivalents of active hydrogen compound, more preferably at most 1 equivalent of active hydrogen compound, and most preferably at most 0.95 equivalent of active hydrogen compound are used per equivalent of residual epoxy functionality.

Active Hydrogen Compounds

As used herein, active hydrogen compounds and/or precursors (i.e., compounds that may form active hydrogen compounds) are compounds that include at least one hydrogen atom that may be readily dissociated in an aqueous environment. Preferably, the hydrogen atom is attached to a nitrogen atom, an oxygen atom, a phosphorous atom, or a sulfur atom.

Useful active hydrogen compounds and/or precursors in which the active hydrogen is attached to nitrogen include, for example, amines, diamines, polyamines, hydrazides, dihydrazides, polyhydrazides, ketimines, diketimines, polyketimines, and combinations thereof.

Useful active hydrogen compounds in which the active hydrogen is attached to oxygen include, for example, dicarboxylic acids, polycarboxylic acids, bisphenols, polyphenols, and combinations thereof.

Useful active hydrogen compounds in which the active hydrogen is attached to sulfur include, for example, mercaptans, dimercaptans, polymercaptans, and combinations thereof.

Preferred active hydrogen compounds include, for example, 3-mercaptopropionic acid, 2-mercaptoethanol, adipic dihydrazide, hydrazine, ammonia, ethylenediamine, N-(2-aminoethyl)ethanolamine, diethylenetriamine, triethylenetetramine, diethanolamine, bisphenol A, bisphenol F, N-ethylethylenediamine, 1,4-butanedithiol, propyleneimine, N,N'-dimethyl-1,6-hexanediamine, 1,6-hexanediamine, and combinations thereof.

Crosslinkers

Crosslinkers may be incorporated into the coating composition to enhance the crosslinking that occurs during the cure of coating composition after being coated on a substrate and dried. Crosslinkers include materials that are capable of reacting with other functionalities present in the coating composition at the curing temperature.

Examples of suitable crosslinkers include amines, melamines, blocked isocyanates, glyco-uryls, ketimines, epoxies, and combinations thereof. Preferred crosslinkers include, for example, blocked isocyanates available under the trade designation VESTANAT 31358/100 from DeGussa Corp. (Parsippany, N.J.).

Surfactants

Surfactants may optionally be used to aid in the preparation of the dispersion. Useful surfactants include, for example, cationic surfactants, nonionic surfactants, and combinations thereof, as described, for example, in *McCutcheon's*, Volume 1: Emulsifiers & Detergents, North American Edition (2001). Useful cationic surfactants include, for example, ethoxylated amines, ethoxylated fatty amines, quaternary ammonium compounds, and combinations thereof. A preferred cationic surfactant is described in U.S. Pat. No. 4,468,307 (e.g., column 9, lines 60-65). Useful nonionic surfactants include, for example, ethoxylated alcylphenols, ethoxylated fatty alcohols, ethoxylated alcohols, and combinations thereof. The surfactant may optionally include a polymerizable ethylenically unsaturated functionality.

When a surfactant is used, preferably at least 0.1% by weight, more preferably at least 0.2% by weight, and most preferably at least 0.5% by weight surfactant is used, based on the total weight of the coating solids. When a surfactant is used, preferably at most 5% by weight, more preferably at most 3% by weight, and most preferably at most 2% by weight surfactant is used, based on the total weight of the coating solids.

Other Coating Additives

Solvents may optionally be added to the coating compositions provided by the present invention as desired. A wide variety of solvents are suitable for use in the present invention. However, as previously mentioned, the use of substantial amounts of solvents may contribute to an undesirably high level of volatile organic compounds that might have to be removed or recovered.

Useful solvents include, for example, aromatic solvents (e.g., xylene, toluene), alcohols (e.g., butanol and amyl alcohol), ethyleneglycol ethers (e.g., 2-butoxyethanol and 2-hexyloxyethanol), propyleneglycol ethers, ketones (e.g., acetone and methyl isobutyl ketone), amides (e.g., 1-methyl-2-pyrrolidinone and N,N-dimethylformamide), and combinations thereof. Preferred solvents include, for example, 1-methyl-2-pyrrolidinone and N,N-dimethylformamide. When a solvent is used, preferably at most 20% by weight, more preferably at most 10% by weight, and most preferably at most 5% by weight solvent is used, based on the total weight of the coating solids.

Other additives may be added to coating compositions provided by the present invention as desired. Examples of such additives include, for example, dyes and pigments, viscosity modifiers, defoamers, ultraviolet light (UV) absorbers, wetting agents, fillers, dispersants, and combinations therof.

Aqueous Dispersions

Aqueous dispersions of the advanced molecular weight epoxy-amine material may be prepared by acidifying a composition including the advanced molecular weight epoxy-amine material. Acids useful for acidifying the composition are described herein below.

In one embodiment, the advanced molecular weight epoxy-amine material may be combined with an aqueous acid to provide an aqueous dispersion of the advanced molecular weight epoxy-amine, material. Optionally, a surfactant may be used to aid in the formation of the aqueous dispersion. The surfactant may be added to the advanced molecular weight epoxy-amine material either before or after the material is combined with the aqueous acid. Alternatively, the aqueous acid may include a surfactant.

In another embodiment, the advanced molecular weight epoxy-amine material may be acidified with an acid, and the resulting acidified composition may be combined with an aqueous liquid to provide an aqueous dispersion of the advanced molecular weight epoxy-amine material. Optionally, a surfactant may be used to aid in the formation of the aqueous dispersion. The surfactant may be added to the advanced molecular weight epoxy-amine material either before or after acidification with the acid. Alternatively, the aqueous liquid may include a surfactant.

Preferably, sufficient acid is used to provide the desired degree of neutralization of the amine. Preferably, sufficient acid is used to provide at least 0.3 equivalent of acid per equivalent of amine, more preferably at least 0.5 equivalent of acid per equivalent of amine, and most preferably at least 0.6 equivalent of acid per equivalent of amine. Preferably, sufficient acid is used to provide at most 1.5 equivalents of acid per equivalent of amine, more preferably at most 1.2 equivalents of acid per equivalent of amine, and most preferably at most 1 equivalent of acid per equivalent of amine.

Acids

The acid used to make the aqueous dispersion is preferably an aqueous acid. The acid may be an organic acid or an inorganic acid. Examples of useful acids include, for example, carboxy-containing acids, phosphorous-containing acids, sulfur-containing acids, hydrochloric acid, and combinations thereof. Preferably, the acid is soluble in water. Preferably, the acid is a non-volatile material.

Exemplary carboxy-containing acids include, for example, lactic acid, formic acid, acetic acid, dimethylolpropionic acid, erythorbic acid, ascorbic acid, isophthalic acid, phthalic acid, terephthalic acid, maleic acid, succinic acid, propionic acid, acrylic acid, methacrylic acid, carbonic acid, oxalic acid, adipic acid, and combinations thereof.

Exemplary phosphorous-containing acids include, for example, phosphoric acid, phosphoric acid derivatives, and combinations thereof.

Exemplary sulfur-containing acids include, for example, sulfuric acid, sulphonic acid, sulfamic acid, sulfamic acid derivatives, and combinations thereof.

Polymerization of Reactive Diluents

Coating compositions, from aqueous dispersions of compositions including advanced molecular weight epoxy-amine material and reactive diluent, may be prepared by polymerizing the reactive diluent.

The polymerization of the reactive diluents may be induced by any convenient method known in the art. Methods of initiating the polymerization (e.g., thermally induced initiation, photochemically induced initiation) include, for example, the use of initiators (e.g., free radical initiators), or the use of ionizing radiation (e.g., electron beam irradiation). Preferably, initiators (e.g., free radical initiators) are used to initiate the polymerization of the reactive diluents.

Free radical initiators may be added to coating compositions provided by the present invention to aid in the polymerization of the reactive diluents. Useful free radical initiators may be organic (e.g., organic peroxides) or inorganic (e.g., persulfates). Useful free radical initiators include, for example, peroxides, persulfates, persulfites, azoalkanes, and ultraviolet or visible light initiators. Useful peroxide initiation systems include, for example, benzoyl peroxide, tert-butyl hydroperoxide, and a mixture of hydrogen peroxide and benzoin. Useful persulfate inititiation systems include, for example, ammonium persulfate or other alkali metal persulfates optionally combined with a suitable reducing agent. Suitable reducing agents include, for example, hydrazine, ammonium or alkali metal sulfites, bisulfites, metabisulfites, and hydrosulfites. Preferred free radical initiators include, for example, tert-butylhydroperoxide.

If a free radical initiator is used to initiate the polymerization of the reactive diluents, the temperature of the mixture may be adjusted as desired to allow the reaction to take place after the free radical initiator has been added. Preferably, the reaction temperature is at least 20° C., more preferably at least 25° C., and most preferably at least 30° C. Preferably, the reaction temperature is at most 100° C., more preferably at most 90° C., and most preferably at most 85° C.

When a free radical initiator is used to initiate the polymerization, preferably a sufficient amount is used to effectively polymerize the reactive diluent. When a free radical initiator is used to initiate the polymerization of the reactive diluents, preferably at least 0.2% by weight and more preferably at least 0.4% by weight of the initiator is used based on the total weight of reactive diluents. When a free radical initiator is used to initiate the polymerization of the reactive diluents, preferably at most 3% by weight, more preferably at most 2% by weight, and most preferably at most 1% by weight of the initiator is used based on the total weight of reactive diluents.

Coating Compositions

Coating compositions provided by the present invention preferably have useful properties for coating substrates. The coating compositions provided by the present invention are preferably aqueous dispersions that are stable for at least four months at ambient conditions. Preferably, stable coating compositions are aqueous dispersions that do not exhibit a substantial change in viscosity or exhibit colloidal instability. Coatings made from stable aqueous dispersion preferably have substantially the same properties as when they are made.

Preferably, the waterborne coating compositions are substantially free of solvent. Waterborne compositions that are substantially free of solvent preferably include at most 20% by weight solvent, more preferably at most 10% by weight solvent, and most preferably at most 5% by weight solvent, based on the total weight of the solids and solvent in the coating composition.

The aqueous dispersions provided by the present invention are preferably waterborne coating compositions. Waterborne coating compositions are advantageous in that they may have a low volatile organic compound (VOC) content. Waterborne coating compositions provided by the present invention preferably have a volatile organic compound content of at most 0.2 kilograms per liter of solids, more preferably at most 0.1 kilograms per liter of solids, and most preferably at most 0.05 kilograms per liter of solids. When a volatile organic acid is used in the preparation of the waterborne composition, the waterborne coating compositions preferably have a volatile organic compound content, excluding acid, of at most 0.2 kilograms per liter of solids, more preferably at most 0.1 kilograms per liter of solids, and most preferably at most 0.05 kilograms per liter of solids.

Substrates

Coating compositions provided by the present invention preferably are useful for coating any substrate as desired. Preferably, substrates include, for example, cold rolled steel, zinc coated steel, aluminum, fiber boards, cement boards, plastics, paper, wood, and combinations thereof.

Coating Application Drying, and Curing

Coating compositions provided by the present invention may be applied to the desired substrate by any convenient method known in the art. Useful methods include, for example, spraying, roller coating, dip coating, curtain coating, brushing, electro coating, and combinations thereof.

Once the coating is applied to the substrate, the coating may be dried by any convenient method known in the art. Useful methods include, for example, hot air drying (e.g., hot air ovens, air impingement drying, convection drying), exposure to microwave radiation, and exposure to infrared radiation. If the coating composition includes a crosslinker, the coating may optionally be cured during the drying process.

Cured Coating Properties

Preferably, the cured coatings provided by the present invention offer beneficial properties including, for example, chemical resistance, abrasion resistance, barrier properties, adhesion properties, and anti-corrosive properties.

Preferably, the cured coatings provided by the present invention are useful for applications including, for example, packaging coatings, anticorrosive coatings, stain blocker coatings, paper coatings, and cement board or plank coatings.

The present invention is illustrated by the following examples. It is to be understood that the particular examples, materials, amounts, and procedures are to be interpreted broadly in accordance with the scope and spirit of the invention as set forth herein.

EXAMPLES

Unless otherwise specified, all chemical were commercially available from Sigma-Aldrich (St. Louis, Mo.).

All percentages refer to percentages by weight unless otherwise specified. All weights are given in grams (g) unless otherwise specified. All molecular weights are weight average molecular weights unless otherwise specified.

Example 1

An epoxy material available under the trade designation EPON 1004F (902 g) from Resolution Performance Products (Houston, Tex.) was dissolved at 95-100° C. in a mixture of styrene (214.6 g) and butylmethacrylate (214.6 g). An oxygen atmosphere was maintained over the mixture and 2,6-di-tert-butyl-4- methylphenol (0.74 g) was added to stabilize the vinyl monomers. The mixture was cooled to 70-75° C. and diethanolamine (99.6 g) was added over a 30 minute period. After all the diethanolamine was added, the temperature was raised to 88-90° C. and the temperature was maintained for 1.5 hours. The tertiary amine number was then determined to be 38.6. The batch was then cooled to 58-60° C. and a blocked isocyanate available under the trade designation VESTANAT 31358/100 (357.8 g) from DeGussa Corp. (Parsippany, N.J.) was added to the batch followed by the addition of lactic acid (154.5 g, 88% by weight in water). The batch was mixed for 25 minutes before proceeding. Water (3787 g) was added to the batch under high agitation over a period of 30 minutes while maintaining the temperature at 58-60° C. The batch was then stirred for 50 minutes at a temperature of 58-60° C. before cooling the batch to 45-47° C. The atmosphere was then switched from air to nitrogen and a mixture of tert-butylhydropenotide (9.34 g) and water (126.2 g) was added to the batch. After the addition was complete, erythorbic acid (5.12 g) dissolved in water (126.2 g) was fed into the batch over a period of 20 minutes. The batch started to slowly exotherm after 5 minutes. The temperature was maintained below 57° C. After the erythorbic acid addition was complete, the batch was cooled to room temperature. The final dispersion had a solids content of 31.5% by weight.

Example 2

An epoxy material available under the trade designation EPON 828 (1425 g) from Resolution Performance Products (Houston, Tex.) was mixed with Bisphenol A (285 g) from Resolution Performance Products (Houston, Tex.) and ethyltriphenylphosphonium iodide (1.7 g, 95%) at room temperature. Under a nitrogen blanket, the mixture was gradually heated to 162° C. over a time period of 2 hours and 15 minutes. Once the mixture reached 162° C. the temperature was kept constant for 2 hours. At the end of this hold the batch was cooled to room temperature. Below a temperature of 124° C. the nitrogen blanket was removed and an oxygen atmosphere was created. Subsequently 2,6-di-tert-butyl-4-methylphenol (4.4 g) was added to the batch and a mixture of styrene (213.8 g) and butylmethacrylate (213.8 g).

Example 3

The epoxy material prepared in Example 2 (333.62 g) was heated to 75° C. in an oxygen atmosphere. Over a period of 90 minutes a mixture of diethanolamine (38.91 g) and n-butylamine (14.21 g) was added. During the addition of the amine mixture the temperature was allowed to rise to 93° C. At the end of the amine addition a mixture of styrene (6.63 g) and butylmethacrylate (6.63 g) was added and the temperature was kept at 90 to 95° C. for 3 hours and 20 minutes.

The temperature was adjusted to 80° C. then lactic acid (39.1 g, 85% by weight in water) was added. Over a period of 15 minutes 700 g of water was added while maintaining a temperature of 75 to 80° C. During this addition the oxygen atmosphere was replaced by a nitrogen atmosphere. When all water was added n-butylacrylate (40.0 g) was mixed into the dispersion. The temperature was lowered to 45° C. then a mixture of water (50.0 g) and tert-butylhydroperoxide (2.6 g) was added to the dispersion. Over a period of 25 minutes a solution of erythorbic acid (1.4 g) and water (50.0 g) was fed into the dispersion without external heating. After 15 minutes into this feed the temperature reached 54° C. Once the erythorbic acid feed was completed the batch was cooled to room temperature. The product had a solids content of 36.9% by weight.

Example 4

The epoxy material prepared in Example 2 (333.62 g) was heated to 75° C. in an oxygen atmosphere. Over a period of 90 minutes a mixture of diethanolamine (38.91 g) and n-butylamine (14.21 g) was added. During the addition of the amine mixture the temperature was allowed to rise to 93° C. At the end of the amine addition a mixture of styrene (6.63 g) and butylmethacrylate (6.63 g) was added and the temperature was kept at 90 to 95° C. for 3 hours and 20 minutes.

The temperature was adjusted to 81° C. then VESTANAT 31358/100 (106.6 g) from DeGussa Corp. (Parsippany, N.J.) and hydroxyethyl methacrylate (6.0 g) were added. After 30 minutes of mixing at 81° C. lactic acid (39.1 g, 85% by weight in water) was added. Over a period of 20 minutes 859 g of water was added while allowing the temperature to drift from 81° C. to 56° C. During this addition the oxygen atmosphere was replaced by a nitrogen atmosphere. When all water was added n-butylacrylate (34.0 g) was mixed into the dispersion. The temperature was lowered to 45° C. then a mixture of water (50.0 g) and tert-butylhydroperoxide (2.6 g) was added to the dispersion. Over a period of 25 minutes a solution of erythorbic acid (1.4 g) and water (50.0 g) was fed into the dispersion without external heating. After 10 minutes into this feed the temperature reached 54° C. Once the erythorbic acid feed was completed the batch was cooled to room temperature. The product had a solids content of 38.2% by weight.

Coating Properties Evaluation

Coatings made of the epoxy-acrylc hybrids of Examples 1, 3 and 4 were tested for adhesion properties and MEK resistance. Table 1 presents the formulas used to make the coatings.

TABLE 1

Formulas used for the epoxy-acrylic hybrids.

|  | Formula 1 | Formula 2 | Formula 3 |
|---|---|---|---|
| Example 1 resin | 100 | | |
| Example 3 resin | | 100 | |
| Example 4 resin | | | 100 |
| Paraplex WP-1* | 8.0 | | |
| butylglycol | 4.0 | | 4.0 |

*(polymeric plasticizer, Rohm & Haas)

Coatings were prepared by casting 5 mil-wet films of Formulas 1, 2 and 3 on various substrates. The coatings were allowed to dry for 15 minutes at room temperature and were then heated to 185° C. for 30 minutes. The panels were allowed to cool to room temperature prior to any testing.

TABLE 2

MEK double rub resistance.

| Substrate | Formula 1 | Formula 2 | Formula 3 |
|---|---|---|---|
| Bondrite B1000 | 100** | 10 | 50 |
| Bondrite B95 | 100 | 5 | 30 |
| CRS Q-panel* | 100 | 5 | 30 |

*cold rolled steel Q-panel
**at 100 MEK double rubs, the rubbing was stopped.

TABLE 3

Dry adhesion.

| Substrate | Formula 1 | Formula 2 | Formula 3 |
|---|---|---|---|
| Bondrite B1000 | 25* | 0 | 0 |
| Bondrite B95 | 0 | 0 | 10 |
| CRS Q-panel | 0 | 0 | 0 |

*Adhesion test performed according to ASTM D-3359 method B, percent coating loss reported.

TABLE 4

Wet adhesion after 24-hour water soak.

| Substrate | Formula 1 | Formula 2 | Formula 3 |
|---|---|---|---|
| Bondrite B1000 | 100* | 0 | 0 |
| Bondrite B95 | 0 | 0 | 25 |
| CRS Q-panel | 0 | 0 | 0 |

*Adhesion test performed according to ASTM D-3359 method B, percent coating loss reported.

The complete disclosure of all patents, patent applications, and publications, and electronically available material cited herein are incorporated by reference. The foregoing detailed description and examples have been given for clarity of understanding only. No unnecessary limitations are to be understood therefrom. The invention is not limited to the exact details shown and described, for variations obvious to one skilled in the art will be included within the invention defined by the claims.

What is claimed is:

1. A method of preparing a coating composition, comprising the steps of:
    combining an amine and an epoxy material in the presence of a reactive diluent while maintaining an oxygenated condition to provide a composition comprising an advanced molecular weight epoxy-amine material and the reactive diluent, wherein the reactive diluent comprises at least one methacrylate compound;
making an aqueous dispersion of the composition; and
polymerizing the reactive diluent to provide a stain blocker coating composition for wood.

2. The method of claim 1 further comprising adding a crosslinker selected from the group consisting of amines, melamines, glyco-uryls, ketimines, epoxies, and combinations thereof.

3. The method of claim 1 further comprising adding a crosslinker, with the proviso that the added crosslinker does not comprise a blocked isocyanate.

4. The method of claim 1, wherein maintaining an oxygenated condition comprises maintaining an oxygen atmosphere over the combination of amine, epoxy material and the reactive diluent.

\* \* \* \* \*